US006390672B1

(12) United States Patent
Vail et al.

(10) Patent No.: US 6,390,672 B1
(45) Date of Patent: May 21, 2002

(54) SPACE VEHICLE WITH TEMPERATURE SENSITIVE OSCILLATOR AND ASSOCIATED METHOD OF SENSING TEMPERATURE IN SPACE

(75) Inventors: David K. Vail; Thornton Hinshaw, both of Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/488,628

(22) Filed: Jan. 20, 2000

(51) Int. Cl.[7] .............................. G01K 7/00; G05D 23/20
(52) U.S. Cl. .......................... 374/170; 374/171; 331/66
(58) Field of Search .................................. 374/170, 171; 701/13; 331/66, 111

(56) References Cited

U.S. PATENT DOCUMENTS

| | | | |
|---|---|---|---|
| 3,656,066 A | 4/1972 | Reynal | 331/65 |
| 3,906,391 A | 9/1975 | Murdock | 331/66 |
| 3,971,362 A | 7/1976 | Pope et al. | 128/2 P |
| 4,202,203 A | 5/1980 | Potter | 73/61.1 R |
| 4,471,354 A * | 9/1984 | Smith | 340/870.17 |
| 4,559,954 A * | 12/1985 | Murase | 128/736 |
| 4,602,871 A * | 7/1986 | Hanaoka | 374/102 |
| 4,638,664 A | 1/1987 | Tamura | 73/384 |
| 4,658,407 A * | 4/1987 | Iwama | 377/25 |
| 4,719,432 A * | 1/1988 | Heck et al. | 331/66 |
| 5,200,714 A | 4/1993 | Hayashi | 331/66 |
| 5,407,276 A * | 4/1995 | Jones | 374/184 |
| 5,587,714 A * | 12/1996 | Chu et al. | 342/354 |
| 5,638,418 A * | 6/1997 | Douglass et al. | 377/25 |
| 5,680,141 A * | 10/1997 | Didomenico et al. | 342/372 |
| 5,744,973 A | 4/1998 | Bird | 324/707 |
| 5,861,625 A | 1/1999 | Wurden | 250/338.1 |
| 6,003,817 A * | 12/1999 | Basuthakur et al. | 244/158 R |

OTHER PUBLICATIONS

"SOT Temperature Sensor With Multidrop Single–Wire Digital Interface", Maxim Integrated Products Catalog, 1999, pp. 1–12.
Gauthier et al., "Radiation–Effects Testing for Space and Military Applications", ICS Radiation Technologies, pp. 1–5, no date.
"Single Module Instrument and Actuator Control" Harris Electronic Systems Catalog, Harris RH3000 Instrument Controller, no date.
" Radiation Hardened Quad Voltage Comparator" Intersil Data Sheet, May 1999 HS–139RH File No. 3573.2.

* cited by examiner

*Primary Examiner*—Diego Gutierrez
*Assistant Examiner*—Lydia M. De Jesús
(74) *Attorney, Agent, or Firm*—Allen, Dyer, Doppelt, Milbrath & Gilchrist, P.A.

(57) ABSTRACT

A space vehicle includes a temperature sensitive oscillator carried by a housing. The temperature sensitive oscillator includes a radiation hardened inverting gain circuit, such as a comparator, able to withstand radiation in an ambient space environment, and a thermistor connected to the radiation hardened inverting gain circuit so that an output frequency of the temperature sensitive oscillator varies based upon a temperature of the thermistor. Also, a frequency counter is preferably connected to the temperature sensitive oscillator for generating a digital output signal representative of a sensed temperature. The sensed temperature may be used by one or more electronic circuits connected to the frequency counter.

44 Claims, 3 Drawing Sheets

US 6,390,672 B1

SPACE VEHICLE WITH TEMPERATURE SENSITIVE OSCILLATOR AND ASSOCIATED METHOD OF SENSING TEMPERATURE IN SPACE

FIELD OF THE INVENTION

The present invention relates to the field of temperature measurement, and, more particularly, to measuring temperature in an ambient space environment.

BACKGROUND OF THE INVENTION

Typical spaceborne electronic systems require the temperature to be sensed at many points so that the effects of temperature can be compensated. For example, a conventional satellite based phased array antenna includes multiple stationary antenna elements in which the relative phases of the respective signals feeding the antenna elements are varied to scan an effective radiation pattern or beam in a desired direction from space. Radio frequency (RF) elements of the phased array antenna need to be compensated in view of the ambient temperature range experienced by the antenna.

A conventional approach uses resistive thermal devices (RTDS) or current mode active sensors, such as the AD590 from Analog Devices of Norwood Mass., to measure temperature. However, RTDs require complex conditioning of the low signal level, and the AD590 may require special shielding in space due to radiation susceptibility. Also, the AD590 can be susceptible to electromagnetic interference (EMI).

Additionally, both RTDs and the AD590 require the use of an analog to digital (A/D) converter to provide a digital signal representative of the sensed temperature. The use of an A/D converter increases the circuit complexity and overall costs because of the additional calibration of the A/D converter that is needed, the radiation susceptibility thereof, and decreased reliability due to the additional parts.

Thus, there is a need for reliably providing a digital measurement of temperature in space without using an A/D converter.

SUMMARY OF THE INVENTION

In view of the foregoing background, it is therefore an object of the invention to provide reliable temperature measurement in space while providing a digital signal representative of a sensed temperature, without the use of an analog to digital converter.

This and other objects, features and advantages in accordance with the present invention are provided by a space vehicle including a temperature sensitive oscillator which, in turn, includes a radiation hardened inverting gain circuit. Preferably, the radiation hardened inverting gain circuit comprises a radiation hardened comparator. The temperature sensitive oscillator including the radiation hardened inverting gain circuit is able to withstand radiation in an ambient space environment. The temperature sensitive oscillator also includes a thermistor connected to the radiation hardened inverting gain circuit so that an output frequency of the temperature sensitive oscillator varies based upon a temperature of the thermistor. Also, a frequency counter is preferably connected to the temperature sensitive oscillator for generating a digital output signal representative of a sensed temperature. The sensed temperature may be used by one or more electronic circuits connected to the frequency counter.

The frequency counter may also be radiation hardened. The radiation hardened inverting gain circuit may include a plurality of transistor gates, each having a radiation hardened structure. Also, the radiation hardened inverting gain circuit preferably comprises an output and an input, while the thermistor may be connected between the output and input of the radiation hardened inverting gain circuit. Furthermore, the input may be an inverting input.

In one embodiment, the thermistor may be collocated with the radiation hardened inverting gain circuit and the temperature sensitive oscillator may have an operating temperature range of about −55 to 70° C. Alternatively, the thermistor may be remotely positioned from the radiation hardened inverting gain circuit and the temperature sensitive oscillator may have an operating temperature range of about −80 to 300° C.

The space vehicle may further comprise a calibration processor connected between the frequency counter and the one or more electronic circuits. Furthermore, the space vehicle may include a phased array antenna carried by the housing wherein one electronic circuit is a phased array antenna control circuit connected to the phased array antenna.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout While referring to FIG. 1, a space vehicle, such as a satellite 10, with reliable temperature measurement in space, will now be described The satellite 10 includes a bus or housing 12 having, for example, solar arrays 14 and thrusters 16 mounted thereto as would be appreciated the skilled artisan. The housing 12 is the part of the satellite 10 that carries the payload and other electronic equipment, such as electrical, computer, propulsion and communication equipment, into space.

Figure 1:
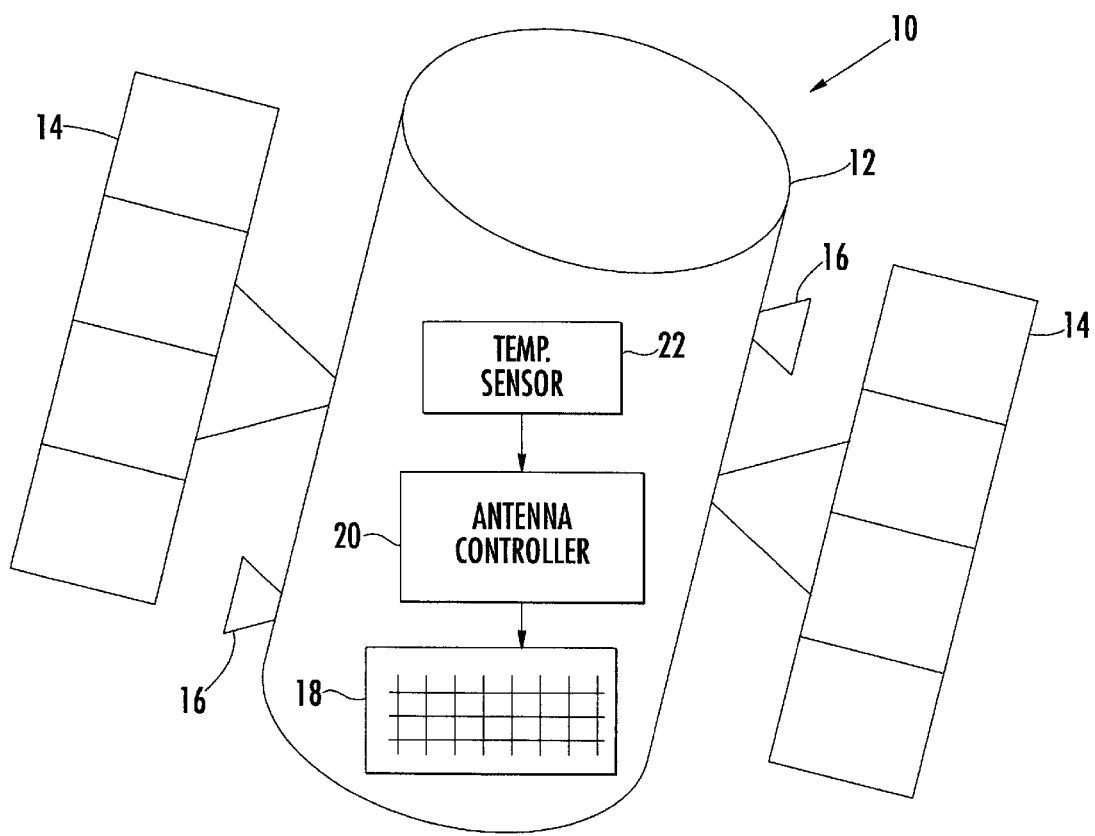
FIG. 1 is a schematic diagram illustrating a satellite including a temperature sensor in accordance with the present invention.

As illustrated in FIG. 1, a phased array antenna 18 is carried by the housing 12. The phased array antenna 18 includes multiple stationary antenna elements in which the relative phases of the respective signals feeding the antenna elements are varied to scan an effective radiation pattern or beam in a desired direction from space, as would be readily appreciated by those skilled in the art. The phased array antenna 18 is controlled by an antenna controller 20 which may receive beam steering commands, e.g. from a ground control station on earth, and which provides antenna element control commands to the phased array antenna 18.

Radio frequency (RF) elements of the phased array antenna 18 need to be compensated in view of the ambient temperature range (e.g. −55° to 70° C.) experienced by the antenna elements. Accordingly, the satellite 10 includes a temperature sensor 22, which in FIG. 1, is schematically illustrated as being carried by the housing 12. Of course, the temperature sensor 22, or portions thereof, may alternatively be a part of the phased array antenna 18 or other antenna elements as would be appreciated by the skilled artisan. Also, the temperature sensor 22 may comprise a plurality of temperature sensors, as would also be readily apparent to those skilled in the art.

Figure 2:
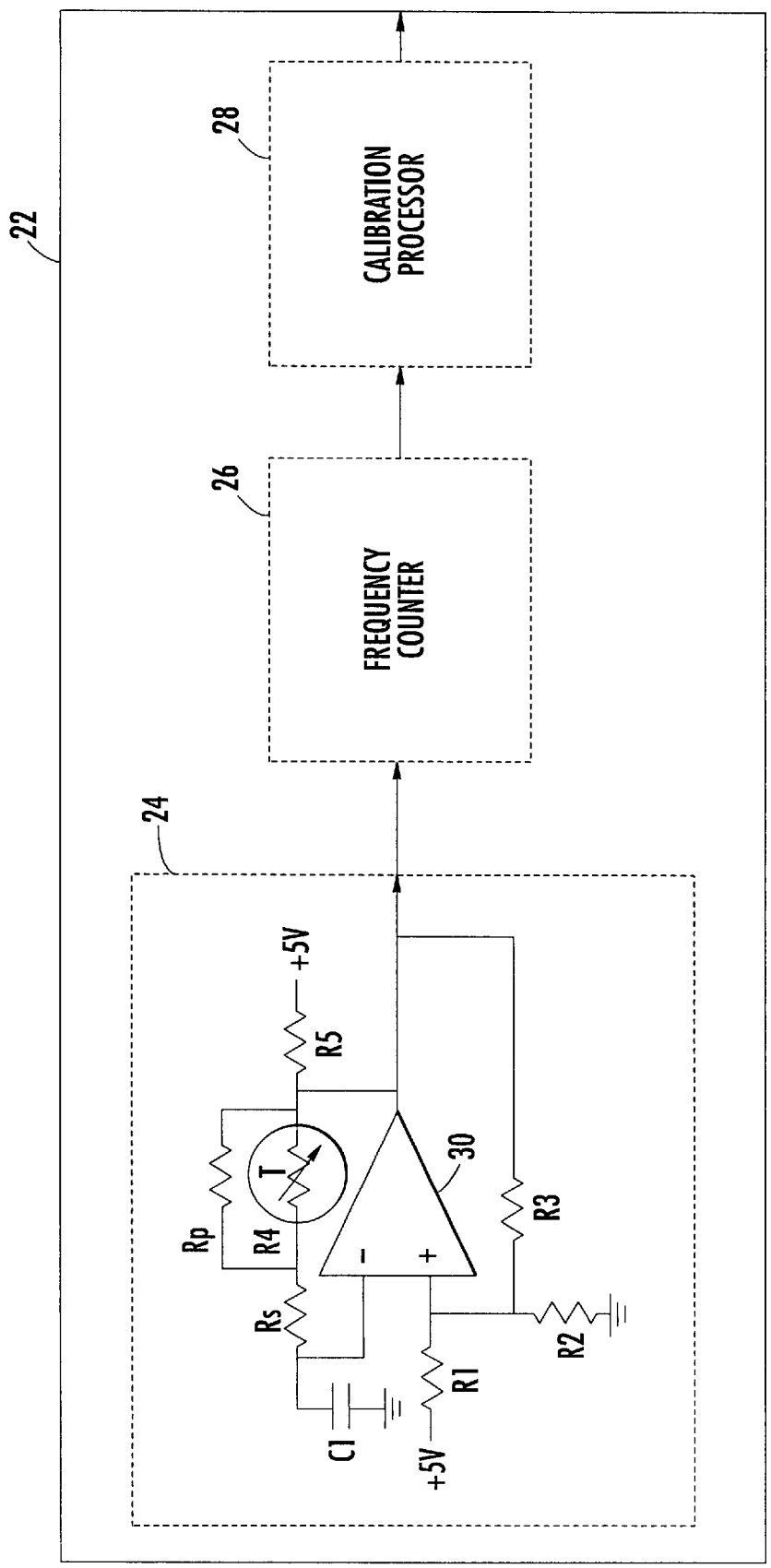
FIG. 2 is a more detailed schematic diagram illustrating the temperature sensor of FIG. 1.

Referring now to FIG. 2, a more detailed embodiment of the temperature sensor 22 will be described. Specifically, the temperature sensor 22 includes a temperature sensitive oscillator (TSO) 24 which outputs a frequency to a frequency counter 26. The temperature sensitive oscillator 24 includes a radiation hardened inverting gain circuit, illustrated in FIG. 2 as a comparator 30, for example, and a thermistor R4 connected thereto so that an output frequency of the temperature sensitive oscillator 24 varies based upon a temperature of the thermistor. The inverting gain circuit may alternatively comprise an op amp, discrete transistors, or any other circuit design which would achieve the intended result, as would appreciated by the skilled artisan.

Furthermore, the temperature sensitive oscillator 24 includes resistors R1, R2, R3, R5, Rp, Rs and capacitor C1 as shown, for example, in FIG. 2. Specifically, as illustrated in FIG. 2, an example of the TSO 24 may include the comparator 30 having an inverted input (−) and a non-inverted input (+). The capacitor C1, connected to ground at one end, is connected to the inverted input and is also connected in series with resistor Rs, thermistor R4 and resistor R5. Resistor R5 is connected to a supply voltage of +5 V, for example. Resistor Rp is connected in parallel with the thermistor R4 between resistors Rs and R5 Also, an output of the comparator 30 is connected between the thermistor R4 and resistor R5. The resistor R1 is connected at one end to a supply voltage of +5 V, for example. The resistor R1 is also connected at the other end to the non-inverted input of the comparator 30, and to the resistor R2 which is connected to ground. The resistor R3 is connected at one end between resistors R1 and R2, and at the other end to the output of the comparator 30.

The thermistor R4, or temperature sensitive resistor, controls the oscillator 24 to directly provide a digital output (i.e. a frequency which is proportional to temperature) so that an A/D converter is not required. The thermistor R4 has a resistance which is highly dependent on temperature. For example, a typical 10K ohm (nominal value) thermistor has a resistance of 453K ohms at −55° C., and 2.3K ohms at +70° C. Furthermore, the thermistor R4 and/or all the TSO 24 parts may also be radiation hardened.

The radiation hardened comparator 30 may include a plurality of transistor gates, each having a radiation hardened structure. An example of a radiation hardened comparator 30 is the HS-139RH from Intersil of Melbourne, Fla., and which is fabricated with Intersil's dielectrically isolated Rad Hard Silicon Gate (RSG) process. Thus, the HS-139RH is highly reliable in any radiation environment and is immune to single event latch-up.

Also, as shown in FIG. 2, the thermistor R4 is preferably connected between an output and an input of the radiation hardened comparator 30. As illustrated, the input is the inverting input (−) In one embodiment, the thermistor R4 may be collocated with the radiation hardened comparator 30 and the temperature sensitive oscillator 24 may have an operating temperature range of about −55 to +70° C. Alternatively, the thermistor R4 may be remotely positioned from the radiation hardened comparator 30 and the temperature sensitive oscillator 24 may have an operating temperature range of about −80 to 300° C.

A preliminary design using, for example, the values R1=36K ohms, R2=36K ohms, R3=10K ohms, R4=10K ohms (nominal value), R5=5K ohms, Rp =100K ohms, Rs=2.5K ohms, and C1=0.1 $\mu$F, results in a frequency range of 39–520 Hz over a temperature range of about −55 to +70° C. An uncalibrated temperature accuracy of +/−6° C. is reasonably attainable, allowing for frequency change due to other causes, such as, initial tolerances, environmental effects and aging effects. The measurement accuracy could be improved by using an advanced circuit topology, adaptive temperature calibration of the TSO 24, and/or components more resistant to environmental and aging effects.

The frequency counter 26 or digital pulse counter may preferably comprise, for example, a gated counter and latch circuit containing a few hundred transistor gates inside an application specific integrated circuit (ASIC), as would be readily appreciated by those skilled in the art. The frequency counter 26 outputs a digital output signal representative of a sensed temperature, e.g. a raw frequency value, to a calibration processor 28. The calibration processor 28 includes stored calibration data of the thermistor R4 and other component. The sensed temperature may be used by one or more electronic circuits, such as the antenna controller 20, connected to the frequency counter 26. The frequency counter 26 and calibration processor 28 may also be radiation hardened.

As can be appreciated from the above discussion, no complex conditioning of the low signal level or special radiation shielding is necessary. Also, the digital output of the TSO 24 has a low susceptibility to EMI. Additionally, because an A/D converter is not required to provide a digital output signal representative of the sensed temperature, the power supply complexity, overall costs and calibration time are not unnecessarily increased. Reduced complexity also improves overall system reliability.

Figure 3:
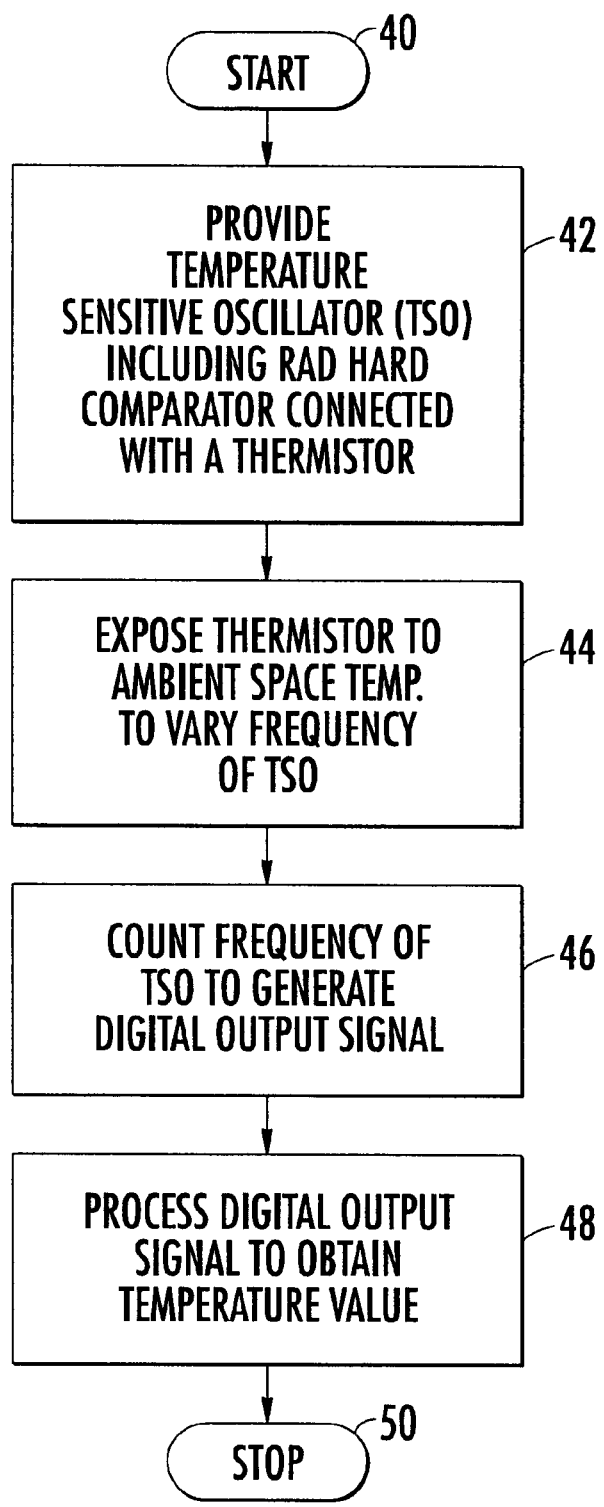
FIG. 3 is a flowchart illustrating the steps of a method of sensing temperature in space in accordance with the present invention.

A method for sensing a temperature associated with a space vehicle, such as a satellite 10, in an ambient space environment will now be discussed while referring to the flowchart of FIG. 3. After the start (Block 40), the method includes the step of providing a temperature sensitive oscillator 24 comprising a radiation hardened comparator 30 and a thermistor R4 connected thereto, at Block 42.

As discussed above, the thermistor R4, or temperature sensitive resistor, controls the TSO 24 to directly provide a digital output (i.e. a frequency which is proportional to temperature) so that an A/D converter is not required. The thermistor R4 has a resistance which is highly dependent on temperature, as described above.

At Block 44, the method includes the step of exposing the thermistor R4 to an ambient temperature to be sensed so that a frequency of the TSO 24 varies based upon the sensed temperature. Then, at Block 46, the frequency of the temperature sensitive oscillator 24 is counted to generate a digital output signal representative of a sensed temperature. This step is preferably performed with a frequency counter 26 or digital pulse counter which may preferably comprise, for example, a gated counter and latch circuit containing a few hundred transistor gates inside an ASIC. The frequency counter 26 outputs a digital output signal representative of a sensed temperature, e.g. a raw frequency value.

The method preferably includes the step of processing the digital output signal to obtain a temperature value therefrom, as illustrated at Block 48, before ending the method at Block 50. Specifically, processing the digital output signal may include the use of a calibration processor 28. The calibration processor 28 includes stored calibration data of the thermistor R4 and other components. The sensed temperature may be used by one or more electronic circuits, such as the antenna controller 20, connected to the frequency counter 26. The frequency counter 26 may also be radiation hardened.

Again, the thermistor R4 is preferably connected between an output and an input of the radiation hardened comparator 30. As illustrated in FIG. 2, the input is the inverting input (−). In one embodiment, the thermistor R4 may be collocated with the radiation hardened comparator 30 and the temperature sensitive oscillator 24 may have an operating temperature range of about −55 to +70° C. Alternatively, the thermistor R4 may be remotely positioned from the radiation hardened comparator 30 and the temperature sensitive oscillator 24 may have an operating temperature range of about −80 to 300° C.

In accordance with the method described above, no complex conditioning of the low signal level or special radiation shielding is necessary. Also, the digital output of the TSO 24 has a low susceptibility to EMI. Additionally, because an A/D converter is not required to provide a digital output signal representative of the sensed temperature, the power supply complexity, overall costs and calibration time are not unnecessarily increased. Reduced complexity also improves overall system reliability.

Although the temperature sensor 22 is illustrated as being connected to the phased array antenna 18 via the antenna controller 20 in FIG. 1, all other spaceborne electronic systems which would benefit from a reliable digital measurement of temperature may also be connected to or include the above described temperature sensor 22 of the present invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A space vehicle comprising:
   a housing;
   a temperature sensitive oscillator carried by said housing and comprising
      a radiation hardened inverting gain circuit able to withstand radiation in an ambient space environment, and
      a thermistor connected to said radiation hardened inverting gain circuit so that an output frequency of said temperature sensitive oscillator varies based upon a temperature of said thermistor;
   a frequency counter connected to said temperature sensitive oscillator for generating a digital output signal representative of a sensed temperature; and
   at least one electronic circuit connected to said frequency counter and using the sensed temperature therefrom.

2. A space vehicle according to claim 1 wherein said frequency counter is radiation hardened.

3. A space vehicle according to claim 1 wherein said radiation hardened inverting gain circuit comprises a radiation hardened comparator.

4. A space vehicle according to claim 3 wherein said radiation hardened comparator comprises a plurality of transistor gates, each having a radiation hardened structure.

5. A space vehicle according to claim 1 wherein said radiation hardened inverting gain circuit comprises an output and an input; and wherein said thermistor is connected between the output and input of said radiation hardened inverting gain circuit.

6. A space vehicle according to claim 5 wherein the input comprises an inverting input.

7. A space vehicle according to claim 1 wherein said thermistor is collocated with said radiation hardened inverting gain circuit.

8. A space vehicle according to claim 7 wherein said temperature sensitive oscillator has an operating temperature range of about −55 to 70° C.

9. A space vehicle according to claim 1 wherein said thermistor is remotely positioned from said radiation hardened inverting gain circuit.

10. A space vehicle according to claim 9 wherein said temperature sensitive oscillator has an operating temperature range of about −80 to 300° C.

11. A space vehicle according to claim 1 further comprising a calibration processor connected between said frequency counter and said at least one electronic circuit.

12. A space vehicle according to claim 1 further comprising a phased array antenna carried by said housing; and wherein said at least one electronic circuit comprises a phased array antenna control circuit connected to said phased array antenna.

13. A space vehicle comprising:
   a housing;
   a temperature sensitive oscillator carried by said housing and comprising
      a radiation hardened comparator able to withstand radiation in an ambient space environment, and
      a thermistor connected to said radiation hardened comparator so that an output frequency of said temperature sensitive oscillator varies based upon a temperature of said thermistor;
   a frequency counter connected to said temperature sensitive oscillator for generating a digital output signal representative of a sensed temperature; and
   a calibration processor connected to said frequency counter and for processing the digital output signal therefrom.

14. A space vehicle according to claim 13 wherein said frequency counter is radiation hardened.

15. A space vehicle according to claim 13 wherein said calibration processor is radiation hardened.

16. A space vehicle according to claim 13 wherein said radiation hardened comparator comprises a plurality of transistor gates, each having a radiation hardened structure.

17. A space vehicle according to claim 13 wherein said radiation hardened comparator comprises an output and an input; and wherein said thermistor is connected between the output and input of said radiation hardened comparator.

18. A space vehicle according to claim 17 wherein the input comprises an inverting input.

19. A space vehicle according to claim 13 wherein said thermistor is collocated with said radiation hardened comparator.

20. A space vehicle according to claim 19 wherein said temperature sensitive oscillator has an operating temperature range of about −55 to 70° C.

21. A space vehicle according to claim 13 wherein said thermistor is remotely positioned from said radiation hardened comparator.

22. A space vehicle according to claim 21 wherein said temperature sensitive oscillator has an operating temperature range of about −80 to 300° C.

23. A space vehicle according to claim 13 further comprising at least one electronic circuit connected to said calibration processor and using a temperature value therefrom.

24. A space vehicle according to claim 23 further comprising a phased array antenna carried by said housing; and wherein said at least one electronic circuit comprises a phased array antenna control circuit connected to said phased array antenna.

25. A temperature sensor for sensing temperature in an ambient space environment and comprising:
a temperature sensitive oscillator comprising
a radiation hardened inverting gain circuit able to withstand radiation in the ambient space environment, and
a thermistor connected to said radiation hardened inverting gain circuit so that an output frequency of said temperature sensitive oscillator varies based upon a temperature of said thermistor.

26. A temperature sensor according to claim 25 further comprising a frequency counter connected to said temperature sensitive oscillator for generating a digital output signal representative of a sensed temperature.

27. A temperature sensor according to claim 26 wherein said frequency counter is radiation hardened.

28. A temperature sensor according to claim 25 wherein said radiation hardened inverting gain circuit comprises a radiation hardened comparator.

29. A temperature sensor according to claim 25 wherein said radiation hardened inverting gain circuit comprises an output and an input; and wherein said thermistor is connected between the output and input of said radiation hardened inverting gain circuit.

30. A temperature sensor according to claim 29 wherein the input comprises an inverting input.

31. A temperature sensor according to claim 25 wherein said thermistor is collocated with said radiation hardened inverting gain circuit.

32. A temperature sensor according to claim 31 wherein said temperature sensitive oscillator has an operating temperature range o f about −55 to 70° C.

33. A temperature sensor according to claim 25 wherein said thermistor is remotely positioned from said radiation hardened inverting gain circuit.

34. A temperature sensor according to claim 33 wherein said temperature sensitive oscillator has an operating temperature range of about −80 to 300° C.

35. A method for sensing a temperature associated with a space vehicle in an ambient space environment comprising the steps of:
providing a temperature sensitive oscillator comprising a radiation hardened inverting gain circuit and a thermistor connected thereto;
exposing the thermistor to an ambient temperature to be sensed so that a frequency of the temperature sensitive oscillator varies based upon the sensed temperature; and
counting the frequency of the temperature sensitive oscillator to generate a digital output signal representative of a sensed temperature.

36. A method according to claim 35 further comprising the step of processing the digital output signal to obtain a temperature value therefrom.

37. A method according to claim 35 wherein the step of counting the frequency comprises providing a radiation hardened frequency counter.

38. A method according to claim 35 wherein said radiation hardened inverting gain circuit comprises a radiation hardened comparator.

39. A method according to claim 38 wherein said radiation hardened comparator comprises an output and an input; and wherein said thermistor is connected between the output and input of said radiation hardened comparator.

40. A method according to claim 39 wherein the input comprises an inverting input.

41. A method according to claim 35 wherein said thermistor is collocated with said radiation hardened inverting gain circuit.

42. A method according to claim 41 wherein said temperature sensitive oscillator has an operating temperature range of about −55 to 70° C.

43. A method according to claim 35 wherein said thermistor is remotely positioned from said radiation hardened inverting gain circuit.

44. A method according to claim 43 wherein said temperature sensitive oscillator has an operating temperature range of about −80 to 300° C.

* * * * *